United States Patent
Salot et al.

(10) Patent No.: US 7,829,225 B2
(45) Date of Patent: Nov. 9, 2010

(54) NANOSTRUCTURED ELECTRODE FOR A MICROBATTERY

(75) Inventors: Raphael Salot, Lans-en-Vercors (FR); Frederic Gaillard, Voiron (FR); Emmanuelle Rouviere, Saint-Egreve (FR); Steve Martin, St Sauveur (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/793,893

(22) PCT Filed: Dec. 22, 2005

(86) PCT No.: PCT/FR2005/051124
§ 371 (c)(1), (2), (4) Date: Jun. 21, 2007

(87) PCT Pub. No.: WO2006/070158
PCT Pub. Date: Jul. 6, 2006

(65) Prior Publication Data
US 2008/0044732 A1 Feb. 21, 2008

(30) Foreign Application Priority Data
Dec. 23, 2004 (FR) .................................. 04 53182

(51) Int. Cl.
*H01M 10/36* (2010.01)

(52) U.S. Cl. ....................... 429/322; 429/209
(58) Field of Classification Search ................... 429/44, 429/231.95, 322, 209, 218.1, 231.8; 438/113
See application file for complete search history.

(56) References Cited

U.S. PATENT DOCUMENTS 4,439,502 A 3/1984 Brittihn et al. .............. 429/104

(Continued)

FOREIGN PATENT DOCUMENTS

WO WO 99/65821 12/1999

(Continued)

OTHER PUBLICATIONS

International Search Report in French, PCT/FR2005/051124, 6 pgs, (May 31, 2006).

(Continued)

*Primary Examiner*—Jennifer Michener
*Assistant Examiner*—Monique Wills
(74) *Attorney, Agent, or Firm*—Nixon Peabody LLP

(57) ABSTRACT

A new anode configuration (20) is proposed for a lithium microbattery (10). The anode (20) preferably consists of nanotubes or of nanowires (24) such that the empty space (26) left between the different components (24) provides compensation for the inherent swelling upon discharging the microbattery (10). With the absence of stresses on the electrolyte (18), the lifetime of the battery (10) may be increased.

16 Claims, 1 Drawing Sheet

U.S. PATENT DOCUMENTS

Figure 1:
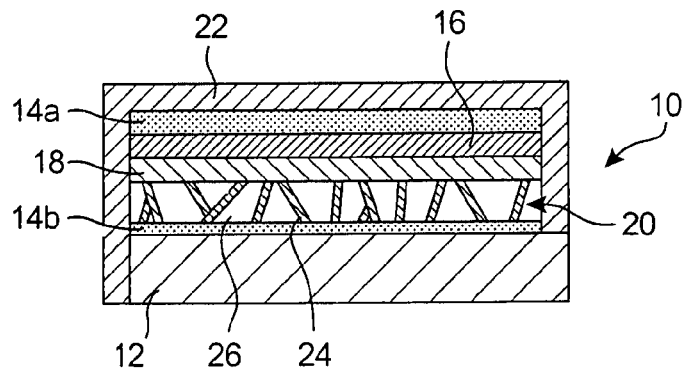

| | | |
|---|---|---|
| 5,486,680 A * | 1/1996 | Lieberman .................. 219/211 |
| 6,168,884 B1 | 1/2001 | Neudecker et al. .......... 429/162 |
| 6,713,987 B2 | 3/2004 | Krasnov et al. ............. 320/107 |
| 6,770,176 B2 | 8/2004 | Benson et al. ......... 204/192.22 |
| 7,235,112 B2 | 6/2007 | Salot et al. ................. 29/623.1 |
| 2001/0023041 A1* | 9/2001 | Hayase et al. ............... 429/303 |
| 2002/0086212 A1 | 7/2002 | Nordlinder et al. ....... 429/231.5 |
| 2006/0154141 A1* | 7/2006 | Salot et al. .................. 429/149 |
| 2007/0037059 A1 | 2/2007 | Salot et al. .................. 429/304 |
| 2007/0048604 A1 | 3/2007 | Gaillard et al. ............. 429/175 |
| 2007/0067984 A1 | 3/2007 | Gaillard et al. ............. 29/923.5 |
| 2008/0008925 A1* | 1/2008 | Deng et al. ................... 429/44 |

FOREIGN PATENT DOCUMENTS

| | | |
|---|---|---|
| WO | WO 01/06578 A2 | 1/2001 |
| WO | WO 03/049219 A1 | 6/2003 |
| WO | WO 2006/021718 A1 | 3/2006 |
| WO | WO 2006/024721 A2 | 3/2006 |

OTHER PUBLICATIONS

Preliminary Search Report in French, FA 662152 and FR 0453182, 3 pgs. (Sep. 6, 2005).

Sharma, S. et al., "Diameter Control of Ti-Catalyzed Silicon NanoWires", J. Crystal Growth (2004); 267: pp. 613-618.

Tang, H. et al., "High Dispersion And Electrocatalytic Properties Of Platinum On Well-Aligned Carbon Nanotube Arrays", Carbon (2004); 42: pp. 191-197.

* cited by examiner

NANOSTRUCTURED ELECTRODE FOR A MICROBATTERY

CROSS REFERENCE TO RELATED APPLICATIONS OR PRIORITY CLAIM

This application is a national phase of International Application No. PCT/FR2005/051124 entitled "Nanostructured Electrode For A Micro-Battery", which was filed on Dec. 22, 2005, which was not published in English, and which claims priority of the French Patent Application No. 04 53182 filed Dec. 23, 2004.

TECHNICAL FIELD

The invention relates to the field of power storage devices, and mainly of microbatteries made in thin films by vacuum deposition methods.

More particularly, the invention relates to an electrode for a battery, notably a lithium battery, the structure of which is defined so as to optimize reliability of power storage.

STATE OF THE PRIOR ART

Among power storage devices, microbatteries which are particularly used, so-called <<fully solid>>batteries, are in the form of films: all the components of the microbattery, i.e., the current collectors, the positive and negative electrodes, the electrolyte and even the encapsulation, are thin layers, obtained by deposition, mainly by physical vapor deposition (PVD) or chemical vapor deposition (CVD). The techniques used allow objects to be made with any shapes.

As usual, the operating principle of such a battery is based on the insertion and removal, also called <<disinsertion>>, of an alkaline metal ion or a proton into and from the positive electrode, and the deposition or extraction of this ion on and from the negative electrode. According to the materials used, the operating voltage of this type of battery is between 1 and 4 V, and the surface capacities are of the order of a few 10 $\mu Ah/cm^2$ to a few hundreds of $\mu Ah/cm^2$. Recharging a microbattery, i.e., transferring ions from the anode to the cathode is generally complete after a few minutes of charging.

Main systems use $Li^+$ as a ion species for transporting the current: the $Li^+$ ion extracted from the cathode during the discharge of the battery will be deposited on the anode, and vice versa, it will be extracted from the anode in order to be inserted in the cathode during the charging. However, the melting point of lithium, 181° C., limits potential use of the battery for high temperatures; in particular, it is impossible to carry out a solder reflow process of the different material layers. Moreover, the strong reactivity of lithium metal with regard to the ambient atmosphere is a penalty, even for the encapsulation. Finally, it is impossible to spray lithium metal, so it is necessary to perform thermal evaporation.

Another option is to select an anode made from a material for inserting the $Li^+$ ion (Li-ion battery), which comes from a cathode, the material of which contains lithium. Now, insertion of the $Li^+$ ion causes swelling of the material which receives it: even the most performing materials used as insertion anodes, such as Si, lead to significant volume expansions (up to 400%). The stresses generated by such a difference in volume strongly strain the superimposed layers, and in particular may cause deteriorations, or even cracks, of the juxtaposed electrolyte, which may create short-circuits making the battery inoperative.

Another alternative is the anodeless battery (also known as a Li-free battery): depositing of $Li^+$ from the cathode is directly carried out on a substrate, a so-called blocking substrate. The protrusions generated by the deposition however are also the source of strong deformations and of potential breaking of the electrolyte.

Problems of stresses in Li-ion or Li-free microbatteries lead to short-circuit rates of the order of 90% after 1000 charging/discharging cycles (versus 5% for lithium metal anodes).

These problems are naturally not posed in batteries with a liquid electrolyte or gel electrolyte, which may be dispersed between the electrodes, and examples of which are given in WO 99/65821.

For fully solid batteries, it was of course suggested that the electrolyte be changed so as to make it in several portions, by inserting inside it fine layers of another material, also a lithium ion conductor, in order to limit possible diffusion of cracks right through the electrolyte layer (see for example U.S. Pat. No. 6,770,176). Such a solution however results in multiplying the number of layers to be deposited (with at least two different targets for the electrolyte), which increases the cost of the manufacturing method, and may only degrade the ionic conductivity of the electrolyte.

DISCUSSION OF THE INVENTION

The object of the invention is to overcome the problems of the state of the art as for the stability of the power storage and supply. More particularly, the invention recommends the use of a new family of electrodes, the architecture and design of which provide suppression of the stresses on the electrolyte during the charging and discharging of the microbattery.

In particular, the expansion of the anode in the direction perpendicular to the substrate and to the electrolyte layer is suppressed.

In one aspect, the invention relates to a microbattery, an electrode of which is formed by independent electrode components, which thereby define gaps without any electrode between them, or empty spaces. Preferably, the empty space rate is larger than 50%, for example of the order of 80%.

The relevant electrode is mainly the anode, the cathode and the solid electrolyte then being in the form of material layers, deposited more or less uniformly. Preferably the anode consists of protrusions extending and protruding from a current-collecting substrate. In particular, for a lithium microbattery, the anode consists of carbon nanotubes or silicon nanowires. Thus, the solid electrolyte rests on the free end of the anode components or more generally the electrolyte layer is held above cavities present between the components of the relevant electrode.

The power storage device according to the invention may be encapsulated in order to insulate the ion exchanger components from the outside.

According to another aspect, the invention relates to a nanowire or nanotube structure on a conducting substrate which may be used for making lithium batteries, as an electrode.

SHORT DESCRIPTION OF THE DRAWINGS

The features and advantages of the invention will be better understood upon reading the description which follows and with reference to the appended drawings, given as an illustration and by no means limiting.

FIG. 1 schematically illustrates power storage according to the invention.

Figure 2A:
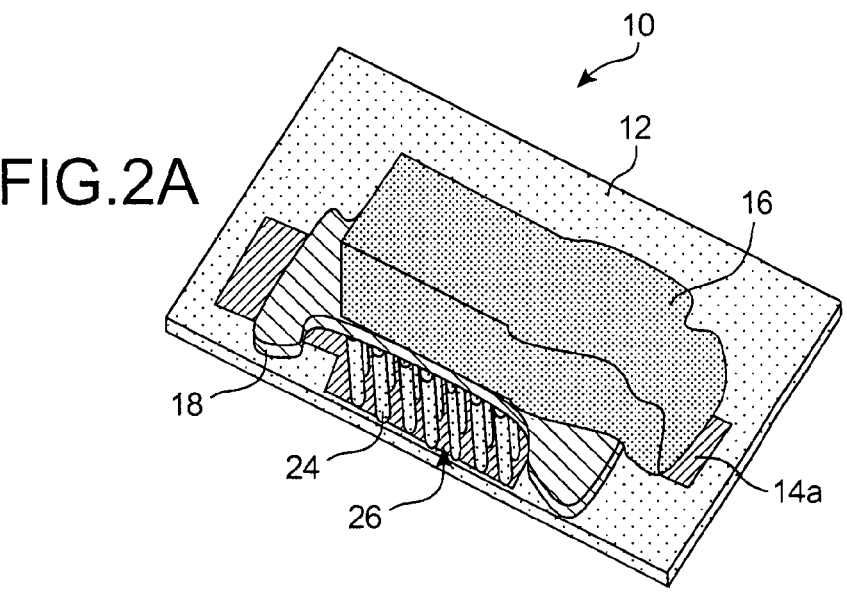
Figure 2B:
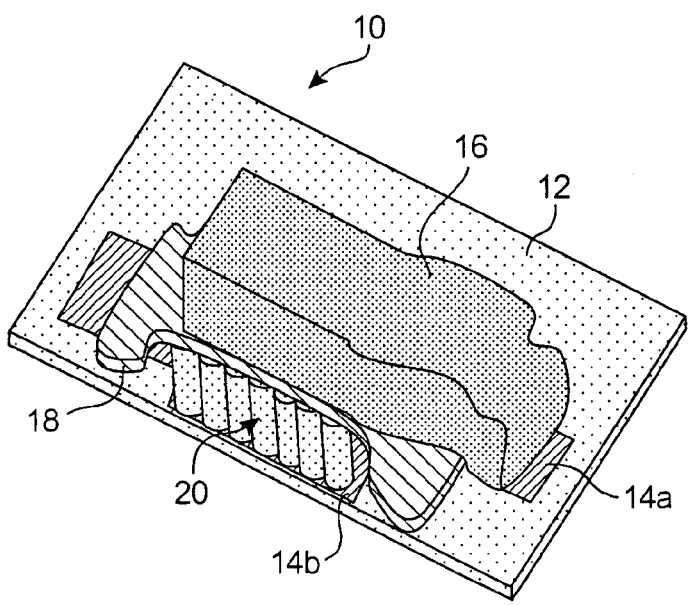

FIGS. 2A and 2B show a device according to the invention in the charged condition and in the discharged condition, respectively.

DETAILED DISCUSSION OF PARTICULAR EMBODIMENTS

As schematized in FIG. 1, a power storage device usually comprises a substrate 12, cathode 14a and anode 14b collectors (the latter may be integral with the substrate 12), a cathode 16, an electrolyte 18, and an anode 20. Moreover, the microbattery 10 may be protected by an encapsulation layer 22: the electrodes 16, 20, notably when they are in lithium, are indeed very reactive towards air, and it may be advantageous to also encapsulate the other components 14, 18.

The total thickness of the stack 14, 16, 18, 20 is usually between 10 and 50 µm, advantageously of the order of 15 µm. Such a microbattery 10, except for the anode 20 which will be described later on, may be made by any known technique, and in particular with different materials:

The current collectors 14 are metal and may for example be deposits based on Pt, Cr, Au, Ti.

The positive electrode 16 may notably consist of $LiCoO_2$, $LiNiO_2$, $LiMn_2O_4$, CuS, $CuS_2$, $WO_yS_z$, $TiO_yS_z$, $V_2O_5$, deposited by a standard technique, with possible thermal annealing in order to increase crystallization and insertion capabilities (notably for lithiated oxides).

The electrolyte 18, which is a good ionic conductor and an electronic insulator, generally consists of a glassy material based on boron oxide, on lithium salts or oxides, in particular a lithium oxynitride. Preferably the electrolyte is based on a phosphate, such as LiPON, or LiSiPON.

In a device 10 according to the invention and as illustrated in FIG. 1, the anode 20 is however made according to an architecture with which any expansion in the direction perpendicular to the surface of the collector substrate 14b and at the adjacent electrolyte surface 18 may be suppressed. This advantage is obtained by means of an electrode 20 comprising electrode components 24 spaced apart from each other, and therefore an anode 20 comprising empty spaces 26: during discharge of the cathode 16, lithium ions will cause swelling of the anode components 24, but the expansion is achieved in the residual empty space 26. Consequently, the electrolyte 18, held by the free ends of the anode components 24, no longer undergoes any induced stress during charging and discharging. Further, this empty space also allows $Li^+$ ions which are not inserted in the anode, to be received and which are deposited as lithium metal. Unlike the close geometry described in WO 99/65821, the electrolyte 18, as a layer, is not at all strained by the expansion because, contrary to a liquid or a gel, the electrolyte 18 does not fit into the residual empty space 26.

Advantageously, the initially present empty space proportion 26 compensates the increase in volume related to the insertion of lithium in the components 24. This optimization is specific to each insertion material, but the empty space rate is usually larger than 50%, preferably larger than 80%.

An example is schematized in FIG. 2: FIG. 2A illustrates the charged condition of the battery 10, in which the anode 20 does not comprise any $Li^+$ ions. During charging, the lithium ions will be inserted into the anode components 24 causing them to swell, so that the residual empty space 26 decreases. However, even in the totally discharged condition of the battery, as schematized in FIG. 2B, the overall volume of the anode layer 20 has not changed, only the empty space rate 26 has decreased, so that neither the electrolyte 18 nor the collector layer 14b have undergone any stress.

The materials used for making the protrusions 24 are materials into which lithium may be inserted (a preferred empty space rate is shown between brackets): germanium (80%), silicon-germanium (80%), silver, tin (70%), . . . and especially silicon (80%) or carbon (50%).

The use of nanostructures, i.e., with sectional dimensions less than a few tens of nanometers, in particular nanotubes and nanowires, is recommended in obtaining optimal results for the expansion problems. In particular, in the case of electrode components 24 as nanotubes, an additional advantage resides in the fact that with the growth of these nanotubes, it is possible to do without the photolithographic step, a very difficult step because of the required precision.

Any technology with which structures of this type (a diameter with very small dimensions) may be obtained, may be used such as full layer deposition followed by the definition of small patterns by photolithography. As for deposition of nanotubes or nanofibers, techniques are described for example in the documents of Sharma S and al.: <<Diameter control of Ti-catalyzed silicon nanowires>>, J. Crystal Growth 2004; 267: pp. 613-618, or Tang H and al.: <<High dispersion and electrocatalytic properties of platinum on well-aligned carbon nanotube arrays>>, Carbon 2004; 42: pp. 191-197.

The electrode components 24 may be randomly positioned forming a sponge type network. Preferably, the components of electrodes are in the form of protrusions 24 protruding from the surface of the collector substrate 14b, in particular as a regular network, for example a square or hexagonal network. The diameter of the protrusions 24 and the pitch of the network may be optimized in order to obtain the sought-after-empty space rate.

In particular, growth of nanowires or nanotubes is preferred, and the obtained network may be regular, with notably protrusions 24 which all protrude from the base surface 14b, according to an angle advantageously as close as possible to 90°. The protrusions 24 may thus consist in a network of wires with a diameter from 5 to 50 nm, spaced apart by 50 to 100 nm with heights between 200 nm and 5 µm.

For example, a microbattery 10 according to the invention comprises a network of Si nanowires 24 with a diameter of the order of 10 nm, with an empty space rate 26 of 80%, deposited on an insulating substrate 12 on which the current collector 14b, for example in Pt, has been deposited. The height of the nanotubes 24 or the thickness of the anode 20 is 1 µm. Next, a 1 µm layer of electrolyte 18 in LiPON is deposited by radiofrequency sputtering; the cathode 16 then consists of a 3 µm $LiCoO_2$ layer, deposited by sputtering or with a magnetron or radiofrequencies, for example.

In addition to the advantage of avoiding any swelling of the anode 20, the electrode structure according to the invention generally provides an increase in the conduction properties, required for proper operation of a battery electrode material.

Moreover, it is preferable that the device 10 according to the invention be encapsulated in fine; this encapsulation may occur for an insulated device, or for a set of microbatteries. The encapsulation 22, which has the purpose of protecting the active stack 14, 16, 18, 20, from the outside environment and specifically from moisture, may be made from ceramic, polymer (such as hexamethyldisiloxane or parylene) or from metal, as well as by a superimposition of layers of these different materials.

It should be further noted that, by means of the invention, encapsulation is facilitated, the layer of which, as the one of the electrolyte, is sensitive to problems of stresses and deformation:

no change in volume of the device 10 occurs, by not using lithium metal, it is possible to generate a less chemically sensitive electrode material and a more smooth surface, on which the encapsulation layers 22 are deposited.

Although described for the anode, it is clear that the electrode structure according to the invention may also be used for the cathode, or even for both electrodes.

Among the targeted applications, supplying power to microsystems appears, in addition to chip cards and smart labels, with which recurrent measurement of parameters may be conducted by miniaturized implants. These applications impose that all the layers required for operating the battery should be made with techniques compatible with industrial methods of microelectronics, which is the case of the device according to the invention.

The invention claimed is:

1. A lithium microbattery comprising at least one first electrode, consisting of a plurality of protruding electrode components defining substantially empty gaps between them, a second electrode and an electrolyte localized between both electrodes, characterized in that the electrolyte is solid, and held above the gaps by electrode components, wherein the substantially empty gaps compensate for an increase in volume related to the insertion of lithium in the components.

2. The lithium microbattery according to claim 1, wherein the volume occupied by the electrode components is less than 50%, preferably of the order of 20% of the volume defined by the first electrode.

3. The lithium microbattery according to claim 1, wherein the first electrode is positioned on a surface of a collector substrate.

4. The lithium microbattery according to claim 3, wherein the electrode components form a network of protrusions which protrude from the surface of the collector substrate.

5. The lithium microbattery according to claim 4, wherein the protrusions are of a diameter between 5 and 50 nm and are spaced apart by 50 to 100 nm.

6. The lithium microbattery according to claim 4, wherein the protrusions extend over 200 nm to 5 μm perpendicularly to the surface of the collector substrate.

7. The lithium microbattery according to claim 1, wherein the first electrode is the anode.

8. The lithium microbattery according to claim 7, wherein the electrode components are carbon or silicon nanotubes or nanowires.

9. The lithium microbattery according to claim 1, wherein the second electrode and the electrolyte each consist of a material layer.

10. The lithium microbattery according to claim 9, wherein the electrolyte is a lithium oxynitride.

11. The lithium microbattery according to claim 1, further comprising an encapsulation layer which insulates the electrodes and the electrolyte from the outside environment.

12. The device according to claim 1, further comprising an encapsulation layer which insulates the electrodes and the electrolyte from the outside environment.

13. The device according to claim 2, wherein the first electrode is positioned on a surface of a collector substrate.

14. The device according to claim 5, wherein the protrusions extend over 200 nm to 5 μm perpendicularly to the surface of the collector substrate.

15. The device according to claim 6, wherein the first electrode is the anode.

16. The device according to claim 8, wherein the second electrode and the electrolyte each consist of a material layer.

* * * * *